Patented Sept. 18, 1951

2,568,682

UNITED STATES PATENT OFFICE 2,568,682

HYDROXYALKYLHYDROPEROXIDES

Charles L. Levesque, Philadelphia, Pa., assignor to Rohm & Haas Company, Philadelphia, Pa., a corporation of Delaware No Drawing. Application August 10, 1949,
Serial No. 109,623

4 Claims. (Cl. 260—610)

This invention relates to liquid and stable organic hydroperoxides. More specifically, it relates to liquid and stable 1-hydroxyalkylhydroperoxides-1 which have the general formula

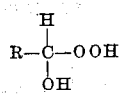

in which R is an alkyl group having a branched chain of 6 to 9 carbon atoms.

While some hydroxyhydroperoxides are known, the particular products of this invention have the advantage of being colorless, liquid, and stable. Since they are liquids, they are more conveniently handled than solid hydroperoxides and, since they are miscible with styrene, they are particularly well-suited as catalysts for the polymerization of styrene alone and in conjunction with other copolymerizable materials such as the unsaturated, vulcanizable, linear polyesters of the alkyd type. The products of this invention accelerate the polymerization of styrene and its copolymerizable mixtures far more effectively at temperatures below 80° C. and especially at temperatures from 20° C. to 40° C. than do other hydroxyhydroperoxides which were known heretofore, particularly in the presence of accelerators such as cobalt salts. In addition, these hydroxyhydroperoxides have pleasant odors, are not irritating or explosive and, consequently, can be shipped, stored, and utilized with ease and greater safety.

The hydroxyhydroperoxides of this invention are most readily prepared by reacting an aldehyde, which contains a branched chain of 6 to 9 carbon atoms attached to the —CHO group, with hydrogen peroxide according to the following equation:

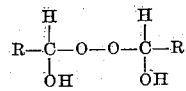

The reaction is best conducted by dissolving the aldehyde in a solvent such as ether, chilling the solution to a temperature below 20° C. and preferably from 0° to 20° C., adding the hydrogen peroxide, and allowing the reaction mixture to stand at 0° to 20° C. for at least two hours and preferably for two to twenty-four hours, after which the solvent and excess hydrogen peroxide is stripped off leaving the clear, liquid 1-hydroxyalkylhydroperoxide-1. The use of an excess amount of hydrogen peroxide over that shown in the above equation is recommended in order to prevent the formation of di-substituted peroxides,

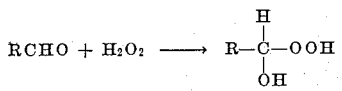

The excess of hydrogen peroxide is readily stripped from the reaction product by warming and/or by a reduction in pressure. Heating converts the 1-hydroxyalkylhydroperoxides-1 to the corresponding acids and water.

In the general formulas above, the character R represents a branched-chain alkyl group of 6 to 9 carbon atoms. Such groups are exemplified by the following:

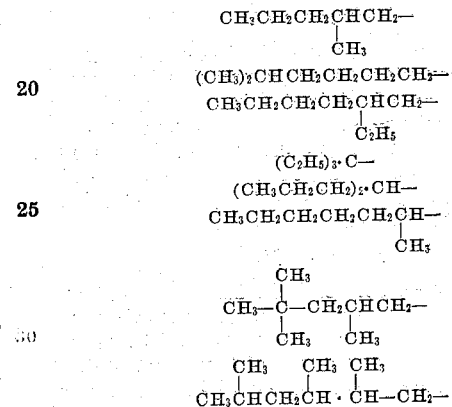

and the branched isomers of these alkyl groups. It is essential that the group which is represented by R contain from 6 to 9 carbon atoms and that the chain be branched. The stability of the products increases as the molecular weight increases; that is, as the group represented by R increases in size from 6 to 9 carbon atoms. Thus, the products of this invention are 1-hydroxyisoheptylhydroperoxides-1, 1-hydroxyisooctylhydroperoxides-1, 1-hydroxyisononylhydroperoxides-1, and 1-hydroxyisodecylhydroperoxides-1. The stability of the hydroxyhydroperoxides in which R contains less than six carbon atoms is so low that there is some danger attending their use. Furthermore, the solubility of the lower hydroxyhydroperoxides in polymerizable, monomeric materials decreases with the molecular weight of the compound. On the other hand, as the molecular weight increases with the size of the group represented by R above, it is evident that the content of active oxygen decreases; and above the 1-hydroxyisodecylhydroperoxides-1, the activity of these compounds is not sufficient to permit their practical use in commerce.

The following examples illustrate how the products of this invention are prepared by the preferred process.

*Example I*

A mixture of 500 cc. of diethyl ether, 150 cc. of isononylaldehyde (3,5,5 - trimethylhexaldehyde) and 20 grams of sodium sulfate was prepared in a one-liter Erlenmeyer flask. The mixture was chilled to 5° C. and 22 cc. of hydrogen peroxide (90% $H_2O_2$) was added, after which the flask was lightly stoppered and placed in a refrigerator at about 5° C. for 24 hours. This mixture was then filtered and stripped for four hours at room temperature at a pressure of 3 mm. The residue which weighed 147 grams was a clear, colorless, viscous liquid. Analysis showed it to contain 9.17% active oxygen as against a theoretical value of 9.20% active oxygen for 1-hydroxyisononylhydroperoxide-1, ($n_D^{25}$, 1.4434).

In a test for stability the liquid was maintained at its boiling point for one hour. At five-minute intervals a glowing splinter was introduced into the test tube containing the boiling peroxide. In no instance did the splinter burst into flame, thus indicating the absence of oxygen. Droplets of water deposited on the walls of the test tube. The product on being cooled was titrated with sodium hydroxide and was found to contain 81% nonanoic acid. A qualitative test with starch-iodide paper indicated the presence of undecomposed peroxide. From this it is apparent that the peroxide decomposes slowly—but not explosively—to yield mainly nonanoic acid and water.

*Example II*

In an identical manner, 1-hydroxy-2-ethylhexylhydroperoxide-1 was prepared from a mixture of 150 cc. of diethyl ether, 32 grams of 2-ethylhexaldehyde, 6.8 cc. of 90% hydrogen peroxide and 10 grams of sodium sulfate. The product was 30 grams of a yellowish, viscous liquid which analysis showed to be 1-hydroxy-2-ethylhexylhydroperoxide-1.

*Example III*

By the process set forth in Example I above, a yield of 32.5 grams of 1-hydroxyisoheptylhydroperoxide-1 was obtained by reacting 28.5 grams of isoheptylaldehyde (prepared from dipropylene by the Oxo process) and 6.8 cc. of hydrogen peroxide (90% $H_2O_2$) in the presence of 150 cc. of diethyl ether and 10 grams of sodium sulfate.

The products of this invention are not to be confused with hydroperoxides which are lacking in the hydroxyl group. The former are distinguished from the latter in having much greater catalytic activity at room temperature on styrene, for example, and its copolymerizable mixtures with unsaturated alkyds, and also in having greater sensitivity to the accelerating activity of heavy metal ions such as cobalt ions.

I claim:

1. As new compositions of matter, the 1-hydroxyisoalkylhydroperoxides-1 having the general formula

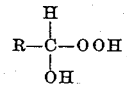

in which R represents an alkyl group having a branch chain containing 6 to 9 carbon atoms.

2. As new compositions of matter, the 1-hydroxyisoalkylhydroperoxides-1 having the general formula

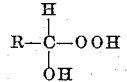

in which R represents an isooctyl group.

3. As new compositions of matter, the 1-hydroxyisoalkylhydroperoxides-1 having the general formula

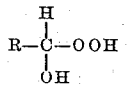

in which R represents an isoheptyl group.

4. As new compositions of matter, the 1-hydroxyisoalkylhydroperoxides-1 having the general formula

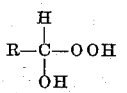

in which R represents an isononyl group.

CHARLES L. LEVESQUE.

REFERENCES CITED

The following references are of record in the file of this patent:

UNITED STATES PATENTS

| Number | Name | Date |
| --- | --- | --- |
| 2,496,864 | Fiedler et al. | Feb. 7, 1950 |

OTHER REFERENCES

Reiche: Ber. der Deutsch Chem. Gesell., vol. 64B, pages 2328 to 2335 (1931).

Spath et al.: Ber. der Deutsch Chem. Gesell., vol. 74B, pages 1552 to 1556 (1941).

Milas et al.: Jour. Am. Chem. Soc., vol. 61, pages 2430 to 2432 (1939).

Milas et al.: Jour. Am. Chem. Soc., vol. 68, pages 533 and 534 (1946).